(12) United States Patent
Barish et al.

(10) Patent No.: US 9,483,555 B2
(45) Date of Patent: Nov. 1, 2016

(54) FLEXIBLE METHODS FOR CATALOGUING METADATA AND FOR SPECIFYING A PLAY QUEUE FOR MEDIA SYSTEMS

(75) Inventors: Jeffrey Barish, Telluride, CO (US); Eric A. Shreve, Louisville, CO (US)

(73) Assignee: 3BEEZ, LLC, Louisville, CO (US)

( * ) Notice: Subject to any disclaimer, the term of this patent is extended or adjusted under 35 U.S.C. 154(b) by 2274 days.

(21) Appl. No.: 12/231,899

(22) Filed: Sep. 5, 2008

(65) Prior Publication Data

US 2010/0076971 A1 Mar. 25, 2010

(51) Int. Cl.
*G06F 7/00* (2006.01)
*G06F 17/30* (2006.01)
*G11B 27/32* (2006.01)

(52) U.S. Cl.
CPC ... *G06F 17/30775* (2013.01); *G06F 17/30749* (2013.01); *G11B 27/322* (2013.01)

(58) Field of Classification Search
None
See application file for complete search history.

(56) References Cited

U.S. PATENT DOCUMENTS

| | | | |
|---|---|---|---|
| 6,928,433 B2* | 8/2005 | Goodman et al. | 386/243 |
| 7,870,165 B2* | 1/2011 | Shike | 707/803 |
| 2005/0114374 A1* | 5/2005 | Juszkiewicz et al. | 707/101 |
| 2005/0172230 A1* | 8/2005 | Burk et al. | 715/716 |
| 2006/0224962 A1* | 10/2006 | Ostojic et al. | 715/716 |
| 2008/0201308 A1* | 8/2008 | Sayfan | 707/4 |
| 2008/0222546 A1* | 9/2008 | Mudd et al. | 715/765 |
| 2009/0063521 A1* | 3/2009 | Bull et al. | 707/100 |
| 2009/0158146 A1* | 6/2009 | Curtis et al. | 715/700 |
| 2009/0177301 A1* | 7/2009 | Hayes | 700/94 |

OTHER PUBLICATIONS

"Reference Manual HDX Hard Disk Player English", NAIM Audio Limited, Southhampton Road, Salisbury, England SP1 21N, Aug. 7, 2008. http://www.naimaudio.com/userfiles/modules/attachment/old-product-manual_hdx_reference_1_eng.pdf.*
"Apple Education—iTunes U User's Guide", Apr. 29, 2008, http://deimos.apple.com/rsrc/doc/AppleEducation-iTunesUUsersGuide/Introduction/chapter_1_section_1.html.*
Qsonix, Qsonix Intelligent Interface Features, http://www.qsonix.com/Public/v5/QsonixI2Features.aspx and http://www.qsonix.com/Public/v5/QsonixI2Demos.aspx.
Meridian Audio, The Meridian Sooloos System_The iPad_iPhone Connection, http://www.meridian-audio.com/sooloos/ipad-iphone.php.
Olive, Olive | Save the Sound, http://www.olive.us/products/olive4hd/overview.html.

(Continued)

*Primary Examiner* — Fred I Ehichioya
*Assistant Examiner* — Hasanul Mobin
(74) *Attorney, Agent, or Firm* — Jennifer L. Bales; Macheledt Bales LLP

(57) ABSTRACT

A flexible method for cataloguing metadata makes it possible for users of digital media systems to define the set of metadata tags that best describe recordings within each genre. Tagging recordings with appropriate metadata facilitates selection of a desired recording. In addition, flexible metadata tags minimize the display area required to present information essential to selecting the desired recording. A flexible method for specifying a Play Queue makes it possible to queue items comprising Collections of Tracks. Tracks can be collected according to various criteria. One type of Collection simply lists the desired Tracks from a single album. Other Collections specify Tracks based on a search of the catalog, a random selection from the catalog, or a previously saved list. Collections maintain their identity in the Play Queue, so users can easily modify or remove a Collection or change the sequence of Collections.

13 Claims, 8 Drawing Sheets

(56) References Cited

OTHER PUBLICATIONS

Sonos, Sonos—Controller for MAC or PC, http://www.sonos.com/products/controllers/desktopcontroller/Default.aspx?rdr=true&LangType=1033.

NAIN Audio, hdx_desktop_client_english_issue_1, http://www.naimaudio.com/userfiles/modules/attachment/hdx_desktop_client_english_issue_1.pdf.

Apple, Inc., Apple—iTunes—What is iTunes—Play and organize your digital media, http://www.apple.com/itunes/what-is/player.html.

* cited by examiner

General use

Forming Play Queues

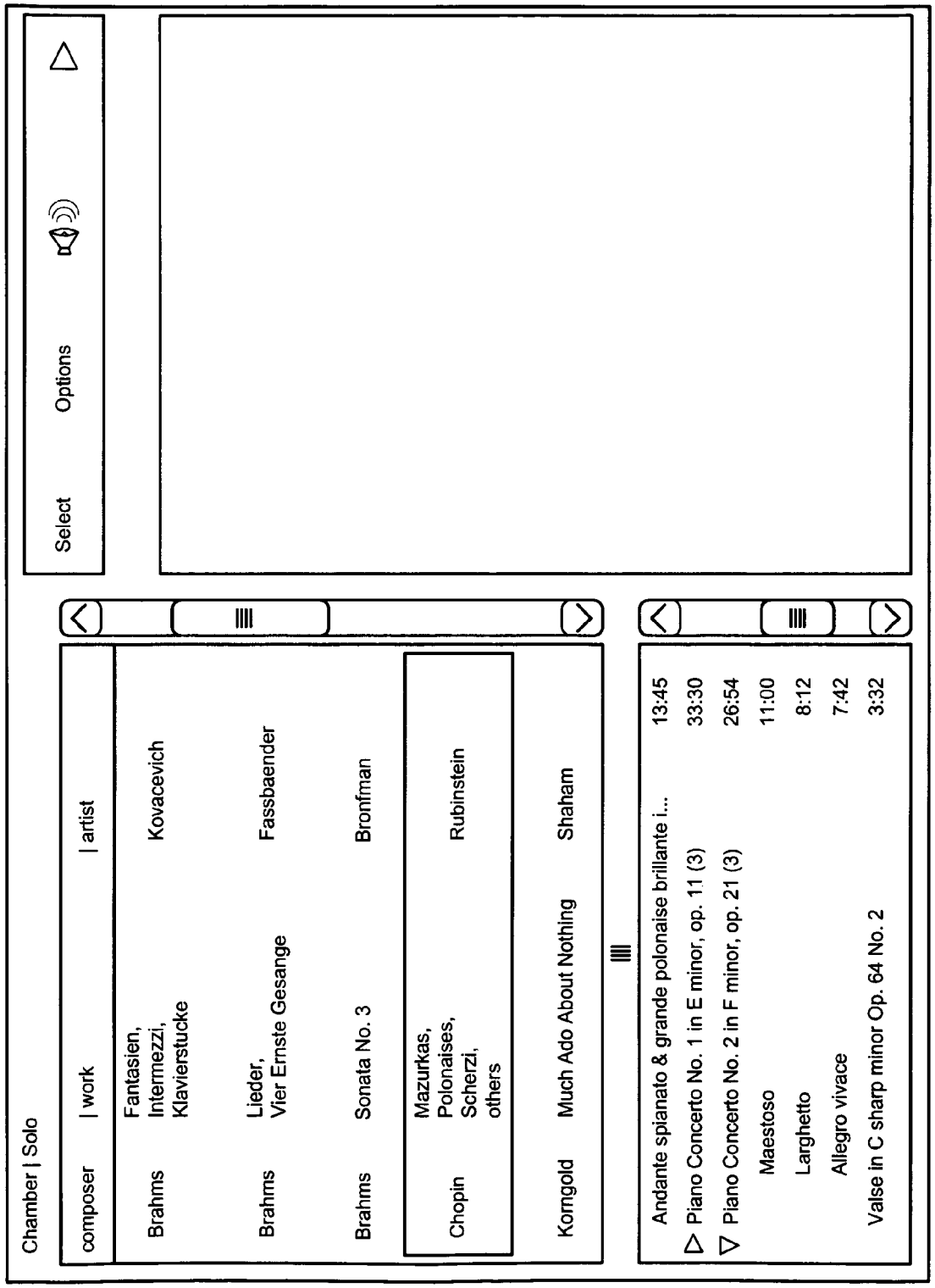

FLEXIBLE METHODS FOR CATALOGUING METADATA AND FOR SPECIFYING A PLAY QUEUE FOR MEDIA SYSTEMS

BACKGROUND OF THE INVENTION

1. Field of the Invention

The present invention relates to media systems comprising devices and systems for storing, cataloguing, and playing media, such as music and video tracks. In particular, the present invention relates to such media systems which utilize flexible sets of metadata tags assigned to tracks based upon track genre.

2. Description of the Related Art

Existing media devices promise easy access to individual works in a digital media collection. Users can store digital copies of music and video recordings in such a device. Playback no longer requires that the user locate physical media and insert the media in a suitable player. Instead, users can access the digital copy stored in the media device and effect playback almost instantaneously.

All such media devices provide a catalog of recordings stored in the archive. The catalog contains Metadata that describes each recording stored in the media device. The challenge in delivering the convenience promised by such devices is in presenting the user with Metadata sufficient to select the desired recordings from the Collection. In the prior art, recordings are typically described by five fields of Metadata called "artist name", "album name", "song title", "year", and "genre". Such a scheme is often sufficient for cataloguing popular music. For example, artist name="The Beatles", album name="Help!", song title="Yesterday" accesses a familiar Beatles hit. However, serious music collectors often find these categories too limited to adequately catalog recordings in their collections. For example, the song "Yesterday" has been recorded by many other artists (more than 3000 versions, according to Wikipedia). How would a collector distinguish the original Beatles version from cover versions by Joan Baez, Frank Sinatra, or Ray Charles? He could assign each of these names to "artist name", but then he has displaced the important information that the original artist was "The Beatles". Five Metadata fields are not sufficient for serious collectors of popular music.

The problems created by the limited number of Metadata fields are even more severe for music from other genres, especially classical music. Consider a recording of the Brahms Violin Concerto with Itzhak Perlman violin soloist and the Chicago Symphony Orchestra conducted by Carlo Maria Giulini. What gets assigned to the artist name tag? "Brahms", "Itzhak Perlman", "Carlo Maria Giulini", and "Chicago Symphony Orchestra" are all names of artists, or a group of artists. And there are other problems. An album named "Great Recordings of the Century" tells a music collector nothing about the work, or works, on the recording. A recital album by a singer may have works by many composers, and how would one identify the accompanist? Five Metadata fields are not sufficient for serious collectors of music from any genre.

Yet simply providing more Metadata fields is not the answer either. A field useful in one class of recordings may not be useful in another class. For example, a field for specifying the name of the orchestra in a recording of the Brahms Violin Concerto has no value when specifying a Beatles recording. The screen space required to display Metadata is often precious, especially when the device with the display is hand-held. It makes no sense to waste it on Metadata with less than maximal utility.

SUMMARY OF THE INVENTION

A need remains in the art for media systems utilizing flexible sets of Metadata tags assigned to tracks according to track genre. This allows Metadata for genres such as classical music, that are not adequately represented by fixed Metadata tags, to be displayed to a user in a more informative way.

A method according to the present invention for cataloguing Albums in a device for selecting and playing Tracks from Albums comprises the steps of: defining a set of Genres, wherein each Genre is associated with its own set of Metadata Tags, assigning each Album to a Genre, and assigning Metadata values to each Metadata Tag in the set associated with the Genre to which an Album is assigned. This method further includes the step of selecting and playing one or more Tracks by designating a current Genre, displaying Metadata Tags and Metadata values for Albums assigned to the current Genre, selecting an Album, displaying Metadata Tags and Metadata values for Tracks from the selected Album, selecting a displayed Track to play, and activating playing the selected Track.

The method may include the step of displaying a short form of Metadata values while selecting a Track and displaying a long form of Metadata values when playing a Track. Or, the method may include the step of displaying more metadata tags while playing a track than while selecting a track. As a feature, the method may include the ability to assign Tracks having a common metadata tag text to a Track Group and display an indication of the Track Group in place of the Tracks.

The method preferably includes the step of aggregating Tracks to form Collections. Then play queues may be formed by selecting Collections and adding the Tracks within the selected Collections to the play queue.

Various ways of aggregating Collections are provided. Tracks may be selected from a single Album. A search of a database containing Metadata may be performed, and the results from the search aggregated to form a Collection. Or, several Tracks may be selected manually from various albums and aggregated to form a Collection. Collections may be labeled with a Collections name and saved for later retrieval.

The invention allows for displaying the names of Collections, selecting Collections by graphically indicating the names of Collections to be selected, and forming a play queue of the Tracks in the selected Collections.

The present invention comprises a method for specifying a play queue including a sequence of Tracks to play. Collections are formed by aggregating Tracks according to user criteria. Then, the user may select among Collections by selecting graphical representations of desired Collections. The selected Collections are placed in the play queue.

Attributes may be assigned to Collections to control how the Collection Tracks are played. For example one attribute could control whether the Tracks in the Collection play in a random order. Another Attribute could control whether the Tracks in the Collection play more than once. The user has the ability to change the order of Collections in the queue by arranging graphical representations of the Collections relative to each other.

Apparatus according to the present invention allows a user to select Tracks from Albums. The apparatus includes a Metadata Server for storing a set of Genres along with Albums wherein each Album is assigned to a Genre, a Play Server for playing Tracks, and a Client Device. The Client Device includes means for allowing the user to select a Genre, means for retrieving information regarding Albums assigned to the selected Genre from the Metadata Server, means for allowing the user to designate Albums and Tracks from the Albums assigned to the selected Genre, and means for directing the Play Server to play designated Tracks. Generally, the Metadata Server is configured to store a database including Metadata tags and values associated with Albums and tracks. In one embodiment, the Client Device is a handheld unit including an interactive display for allowing the user to select Genres and designate Albums and Tracks.

Media collectors can specify the Metadata tags that are appropriate for each genre. For example, collectors might use "artist", "album", and "title" for popular music, but for film music they could use "film" and "composer". For classical music, collectors can specify genres depending on the nature of the works. For example, symphonic music could be described by "composer", "work", "conductor", and "orchestra" while recital albums might be organized by "soloist" and "title". Flexible Metadata makes it possible to display the Metadata that the collector has determined to be optimal for distinguishing the recordings in his Collection.

This invention makes it easy for collectors to select the desired recording. For example, a music lover interested in listening to a particular recording of the Brahms Violin Concerto might first select the genre "Concerto". The list that appears for that genre might have the fields "composer", "work", "conductor", "soloist", and "orchestra". He would scroll to the region in the list in which works by Brahms are displayed. Then he would scroll to the portion of that region with recordings of the Violin Concerto. At this point, it would be a simple matter to distinguish between a recording with Itzhak Perlman as soloist versus one with Joshua Bell. It would even be simple to select the recording with Itzhak Perlman accompanied by the Chicago Symphony Orchestra conducted by Carlo Maria Giulini versus one with that soloist but a different orchestra and conductor.

This invention also describes a new approach for specifying a sequence of recordings to play. In the prior art, users are able to specify a list of Tracks. Position in the list defines the sequence. The new approach uses a Play Queue instead of a play list. A Play Queue makes it possible to sequence Collections of Tracks. A "list Collection"—which most closely resembles the prior art—contains a list of Tracks from a single recording. Other Collections can specify items to play by reading a file, by applying search criteria, or by making a random selection. Different types of Collections may be mixed within a Play Queue. Collections maintain their identities, so a user can view, modify, move, or delete them. Users can also save a Play Queue so that they can play the same sequence on multiple occasions.

BRIEF DESCRIPTION OF THE DRAWINGS

FIG. 8 is an example display of the Metadata catalog of the present invention in select mode, showing one opened and one closed Track Group

DETAILED DESCRIPTION OF THE PREFERRED EMBODIMENT

Figure 1:
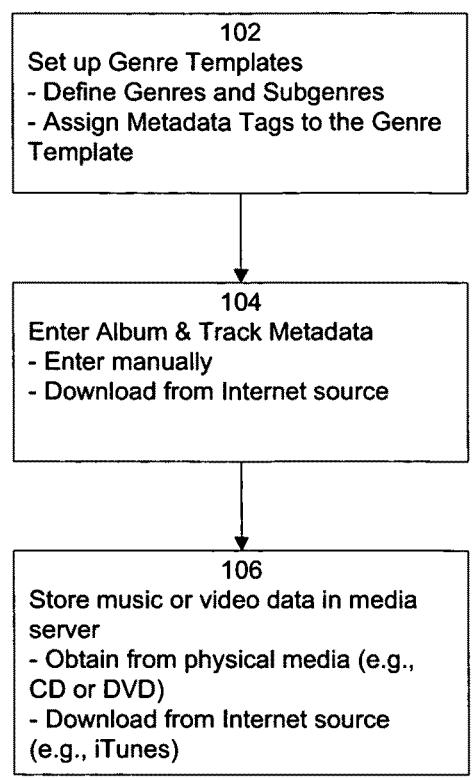
FIG. 1 is a flow diagram illustrating the initial setup of the Metadata catalog of the present invention.

The following glossary defines terms used in the following description and figures.

Glossary

1. Album

An aggregation of related Tracks. Disney's "Little Mermaid Original Soundtrack" contains 20 Tracks and is considered an "Album" of Tracks. Note that on occasion, albums include more than one work. For example, an album of the Brahms Violin Concerto might have as filler the same violinist playing a solo piece. In general, the user will prefer to treat the Brahms Violin Concerto as one Album, and the solo as another Album.

2. Attributes

Attributes are configuration parameters for Collections that describe how each Collection is to be played. Attributes could include volume, repeat, tone control, and random/sequential play.

3. Client/Server

A Server provides a service to a Client. To request that a Server perform its service, the Client sends a command to the Server. The Server responds by performing the service. Performance of the service generally entails the transmission of a response from the Server to the Client. It may also entail the performance of an action (e.g., playing a Media File). The Client and Servers can all run on the same device (e.g., a desktop computer) or they can be distributed across multiple devices depending upon the requirements of the physical system.

A system with a single Zone has one of each type of server in the preferred embodiment. There are three types of servers:

3.1 Play Server

The Play Server is responsible for playing the Media File corresponding to the user's selection. The Play Server also responds with status information such as whether or not it is still playing a selection and the elapsed time.

3.2 Metadata Server

The Metadata Server responds to queries from the Client for information from the catalog. For example, the Client can request a list of all genres for the Albums in the catalog. It can also request a list of all Albums in a particular genre.

3.3 Rip Server

The Rip Server is responsible for extracting data from physical media and storing the data in a Media File. The Rip Server also responds with status information such as whether or not it is still extracting data from the physical medium and the percentage completed.

4. Collection

An aggregation of Tracks, not necessarily from the same Album, that can be put into a Play Queue. A Search Collection contains an aggregation of Tracks that meet specified search criteria. A File Collection contains an aggregation of Tracks that were previously saved on a Server. A List Collection contains an aggregation of Tracks from one or more Albums. Collections have Attributes. Note that a Collection can contain a single Track.

5. Device

A Device is the physical platform for each component (Client, Play Server, Metadata Server, or Rip Server) of the invention. As examples, the Device could be a desktop computer, a PDA, a mobile telephone, an Internet tablet, a tablet PC, or a network storage device (NAS), as appropriate.

6. Filter

A Filter removes from the list of Albums in a genre any that do not conform to a given criterion. For example, a search Filter removes from the list of Albums any that do not contain a given string. Another Filter could remove Albums that have never been played.

7. Generator

A Generator injects Collections into the Play Queue that it creates by applying an algorithm. For example, one Generator could inject a sequence of Collections that it reads from a file. Another Generator could inject a sequence of Collections that specify Tracks chosen randomly from Albums chosen randomly.

8. Genre Template

The Genre Template defines the set of permanent Metadata Tags for a genre. Every genre has a Genre Template. Each Genre Template contains a set of Tags specific to the genre and the size of the sets can vary. All Primary Metadata must be defined in the Genre Template. Secondary Metadata can be defined in the Genre Template. Tertiary Metadata cannot be defined by the user so they do not appear in the Genre Template. Any Metadata Tag that appears in the Genre Template is permanent—that is, it is associated with every Album in a given genre. For example, the Genre Template for rock music might define Primary Metadata Tags "Album" and "Artist" and no Secondary Metadata Tags. The Genre Template for symphonic music might define Primary Metadata Tags "Composer", "Work", and "Conductor" and Secondary Metadata Tags "Orchestra" and "Opus".

9. Media System

A Media System stores the content of media such as CDs and DVDs on a hard disk drive. It makes it possible to access content without manipulating the original media.

10. Metadata

Metadata is data that describes. Metadata can describe either an Album or a Track. For example, the title of an Album is Album Metadata and the title of a Track is Track Metadata.

10.1 Tag/Value/Field

A Tag describes an item of Metadata. For example, Metadata Tags for the rock-genre album AC/DC's "Back in Black" could be Album Title, Artist, and Track Title. Metadata Tags for the film-genre album Disney's "The Little Mermaid Original Soundtrack" could be Title, Composer, Lyricist, Year, Orchestra, Conductor, and Track Title. Each Metadata Tag has a Metadata Value associated with it, which is the information that the user wants to access. For example, the Metadata Value associated with the Metadata Tag "Title" could be "The Little Mermaid Original Soundtrack." A Metadata Field is the combination of a Metadata Tag with its associated Value.

10.2 Primary/Secondary/Tertiary

This invention defines three categories of Metadata: Primary, Secondary, and Tertiary. These categories apply to both Album Metadata and Track Metadata. Primary Metadata appears when the user is selecting an Album. It is the set of Metadata essential to distinguishing Albums in a genre. For example, the Primary Metadata for the "Symphony" genre might contain Composer, Work, Conductor while the Primary Metadata for the "Film" genre might contain only Title. To expedite his selection, the user wants the limited display space filled with Primary Metadata for as many Albums as possible from the genre. Accordingly, values for the Primary Metadata have a short and long form. The short form appears when the user is making a selection. In Play mode, the user has selected an Album, so the limited screen space can be given over to the Metadata for the selected Album. Because screen space is less precious, a long form for the Primary Metadata appears. For example, the long form for Primary Metadata "composer" might be "Wolfgang Amadeus Mozart" in which case the short form would be "Mozart". Primary Metadata also appears when the user is playing an Album, but it appears in its long form. Secondary Metadata appears only in play mode. It provides additional information about an Album that is not essential to distinguishing Albums. For example, the name of a work is usually sufficient to identify it, so the opus number could be recorded as Secondary Metadata. Tertiary Metadata is Metadata that does not appear. It is used internally for purposes not directly accessed by the user. For example, "last played date" could be Tertiary Metadata for recording the date on which an Album was last played. Note that the user cannot define Tertiary Metadata in the Genre Template; it is defined internally.

10.3 Permanent/Extended

These categories apply only to Secondary Metadata. Permanent Secondary Metadata is specified in the Genre Template. It is automatically associated with every Album in a genre, so it always appears when the Secondary Metadata is displayed (in Play mode). Sometimes it is useful to create a new Metadata Field to address a unique situation. For example, the user might want to identify the performer of an obbligato part such as the piccolo solo in John Philip Sousa's The Stars and Stripes Forever. Extended Secondary Metadata makes it possible for the user to create the Metadata for the nonce.

10.4 Summary

The following table summarizes the taxonomy of Album or Track Metadata:
  Primary
    Permanent (from Genre Template)
  Secondary
    Permanent (from Genre Template)
    Extended (special Metadata for a specific Album or Track)
  Tertiary
    Not user configurable The following table summarizes the circumstances in which the various types of Metadata appear:
  Select mode: Primary Metadata in short form.
  Play mode: Primary Metadata in long form and Secondary Metadata (both Permanent and Extended).

10.5 Examples
10.5.1 Primary Metadata
Example Primary Album Metadata for Disney's Little Mermaid Original Soundtrack:

```
film = Name('Little Mermaid', 'The Little Mermaid Original
    Soundtrack')
composer = Name('Menken', 'Alan Menken')
```

(Everything to the left of the equal sign is the Metadata Tag. Everything to the right of the equal sign is the Metadata Value. The first string in the Name( ) command is the short form and the second string is the long form).

Example Primary Track Metadata:

```
Track('Fathoms Below'),
Track('Main Titles'),
Track('Fanfare'),
Track('Daughters Of Triton'),
...
```

10.5.2 Secondary Metadata
Example Secondary Album Metadata for Disney's Little Mermaid Original Soundtrack:

```
lyricist = 'Howard Ashman'
year = '1989'
conductor = 'J.A.C. Redford'
```

Example Secondary Track Metadata for Disney's Little Mermaid Original Soundtrack:

```
Track('Part Of Your World',
    Lyrics = url(http://lyrics.org/Part-Of-Your-World))
```

('Part Of Your World' is Primary Track Metadata and Lyrics is Secondary Track Metadata).

Example Extended Secondary Album Metadata:
Choral Director='Robert Shaw'
Example Extended Secondary Track Metadata:
Piccolo Solo='Lois Schaefer'

Note that url Metadata, as seen in the example above, can be either "live" or "cached". In the first case, the user can activate a hyperlink, which causes the latest version of the referenced material to be downloaded and displayed. For example, clicking on a live url hyperlink to a performance schedule for the artist will download the latest performance schedule. In the second case, the referenced material is downloaded once when the Metadata is first created.

10.5.3 Tertiary Metadata
Tertiary Metadata is Metadata that describes such things as how many times a Track has been played or when a Track was last played.

11. Play Queue
A Play Queue is a sequence of Collections that can be played. A Play Queue is itself a Collection, so it can be inserted in other Play Queues. It can also be saved.

12. Server
See Client/Server.

13. Subgenre
Subgenres provide additional control over what gets displayed when selecting an Album. For example, you might want to file Beethoven Symphony No. 9 in a Subgenre "choral" for symphonic works with chorus while the other Beethoven symphonies go in a Subgenre "instrumental" for purely instrumental symphonies. Both are Subgenres of "symphony". The user can view all the Beethoven symphonies in the genre "symphony" or the respective subset of Beethoven symphonies in the subgenres "choral" or "instrumental".

14. Track
A song or movement from an Album.

15. Track Group
A set of tracks that share a component of their Primary Track Metadata. Grouping the tracks makes it possible to display the shared component only once. For example, an Album of lieder by Richard Strauss might include the ones known as the Four Last Songs. Rather than describing them as "Four Last Songs: Fruhling, Four Last Songs: September", and so on, the user can create a Track Group called "Four Last Songs" and then describe the tracks within the group as "Fruhling", "September", and so on. When the Track Group is closed, only the shared component ("Four Last Songs") appears in the display. When it is opened, the individual tracks in the group become visible as well.

16. Zone
The Play Server plays Media Files. To experience the playing of a Media File, the user connects the output of the Play Server Device to the appropriate audio or video device, e.g., an amplifier and loudspeakers or a TV. The user might have multiple audio/video devices positioned throughout his living space. Each region within the living space covered by a particular audio/video device is a Zone. The current invention supports multiple Zones by permitting multiple Play Servers, one for each Zone.

FIG. 1 illustrates the initial setup of the media system of the present invention. Note that this setup process is not required each time a user uses the media system. In fact, the final user who selects tracks to play and listens to music at the Client Device may never perform these steps, as some or all of the setup might be in place in advance. However, at some point, tracks must have metadata tags assigned to them according to track genre, and tracks (with their metadata tags) must be made available to the server for playing.

In step 102, the user creates a set of Genre Templates. Each Genre Template contains the permanent Metadata Tags, both primary and secondary, for the genre. In step 104, the user enters values for each Metadata Tag for any Albums he wants to store on the server. It may be possible to download values from sources on the Internet, such as Gracenote or All Music Guide, or the user can enter the values manually. In step 106, the user stores the music or video data on the server. The source of the data could be either a recording in the user's collection e.g., CD, LP, DVD, or tape, or a source on the Internet e.g., iTunes.

Figure 2:
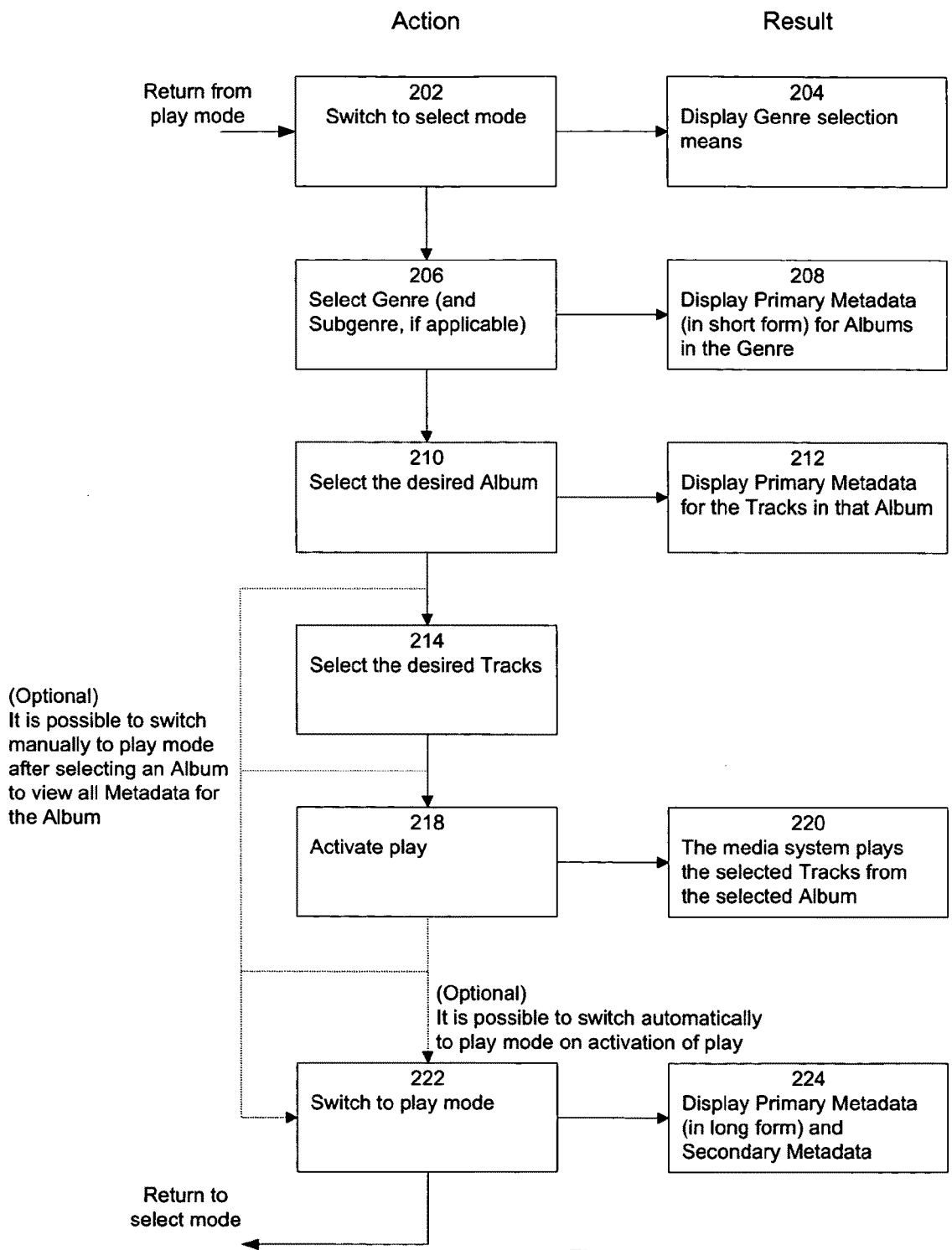
FIG. 2 is a flow diagram illustrating general use of the Metadata catalog of the present invention.
Figure 3:
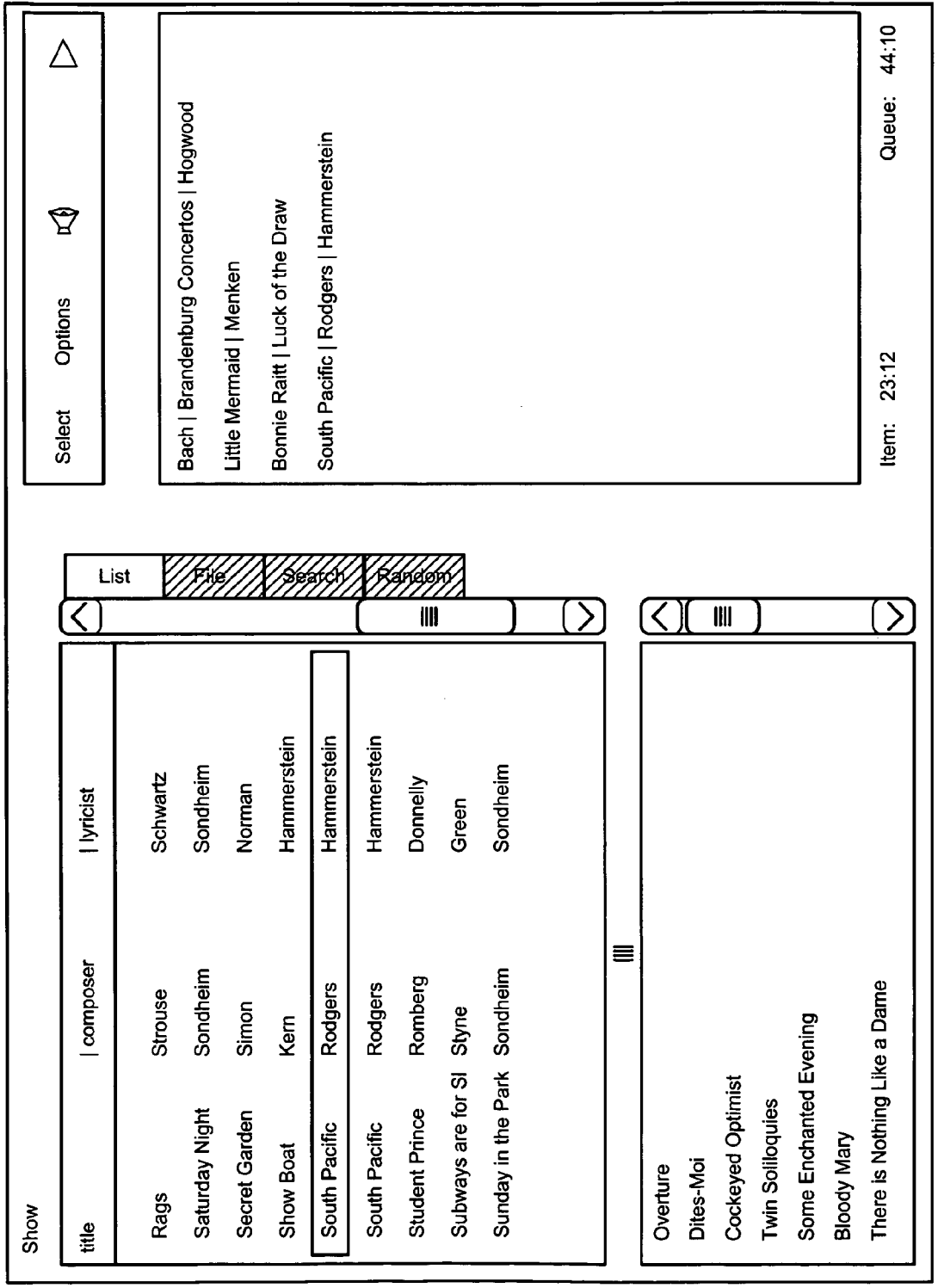
FIG. 3 is an example display of the Metadata catalog of the present invention, illustrating short-form Primary Metadata and a Play Queue.

FIG. 2 illustrates normal operation of the media system to play media—music, for the purpose of this discussion. FIG. 3 is a companion illustration showing a possible embodiment of the invention in normal operation (select mode). In step 202, the system is switched to select mode so that the user can browse tracks according to genre and select tracks to play. When the system switches to select mode, Genre selection means is displayed in step 204.

In step 206, the user selects a Genre. The genre selection appears in the top left of FIG. 3, in this example "Show," for the show tunes Genre. The Client Device (FIG. 6, 604)—usually a desktop computer or a hand-held device—then presents the Primary Metadata for the Albums within that genre (step 208). In FIG. 3, the top left panel contains the Primary Album Metadata. The Metadata Tags appear at the top of the panel, comprising "title", "composer", and "lyricist". Selecting an Album (step 210) causes the Client Device to display the Primary Metadata for the Tracks on that Album (step 212). In FIG. 3, the album "South Pacific" has been selected, and the bottom left panel contains the Primary Track Metadata for this album. The user can then select the Tracks that he would like to play (step 214). In FIG. 3, all Tracks are selected. Once the user has selected the Tracks to play, he can activate Play by clicking the right arrow at the top right of FIG. 3 (step 218). The media system will then play the selected Tracks in sequence (step 220).

Figure 5:
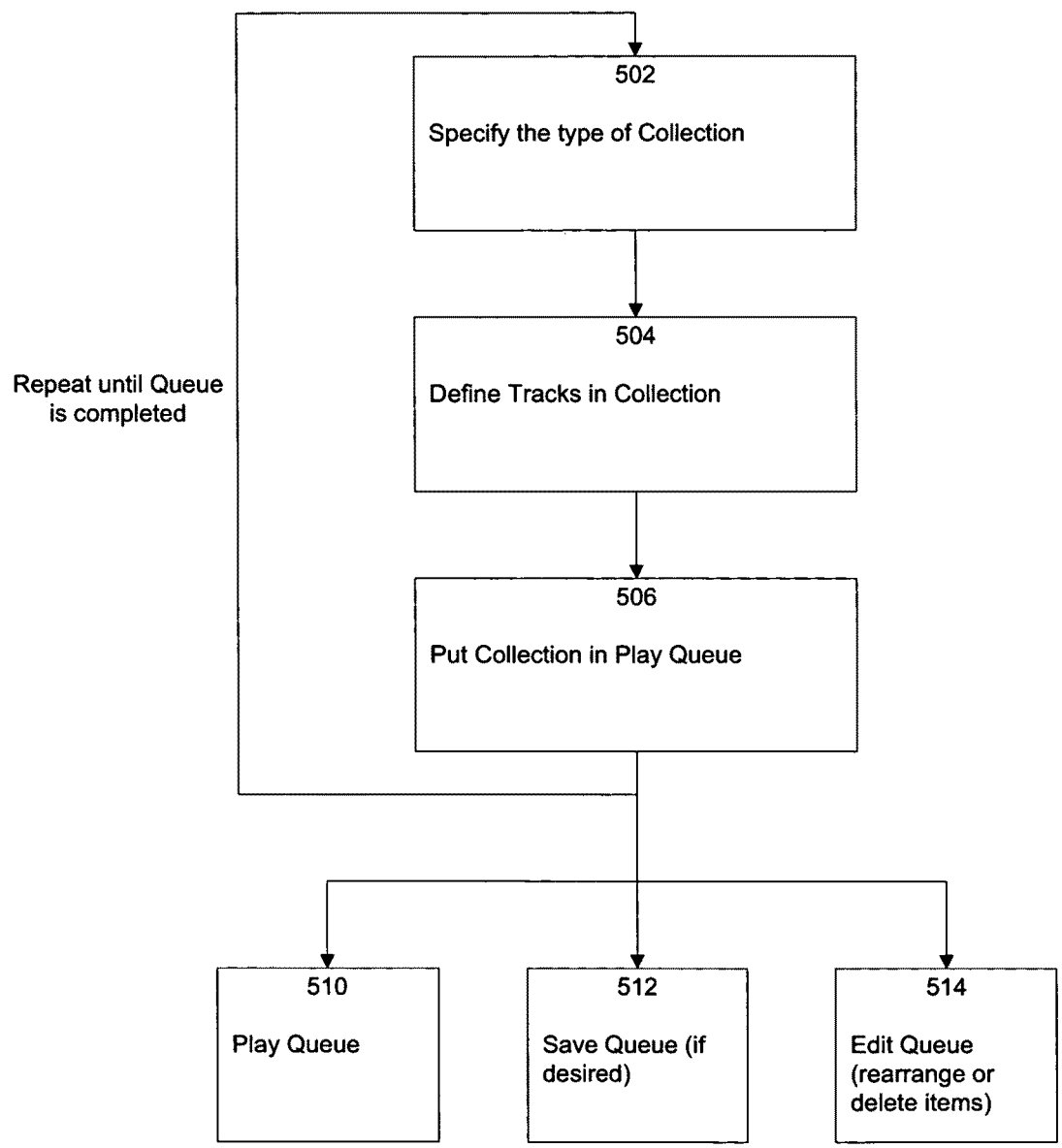
FIG. 5 is a flow diagram illustrating creation of Play Queues with the Metadata catalog of the present invention.

The right hand side of FIG. 3 shows album names for tracks that have already been selected for playing. Hence one or more tracks from Bach Brandenburg Concertos, Little Mermaid, and Bonnie Raitt were already selected for a play queue before the present selection of tracks from South Pacific. FIG. 5 describes the process of creating a play queue in more detail. While the user can't tell which tracks were selected from the current display, or see their Metadata fields, the user can click on the album and the track and Metadata field will appear where the South Pacific Tracks and Metadata fields are shown currently.

Figure 4:
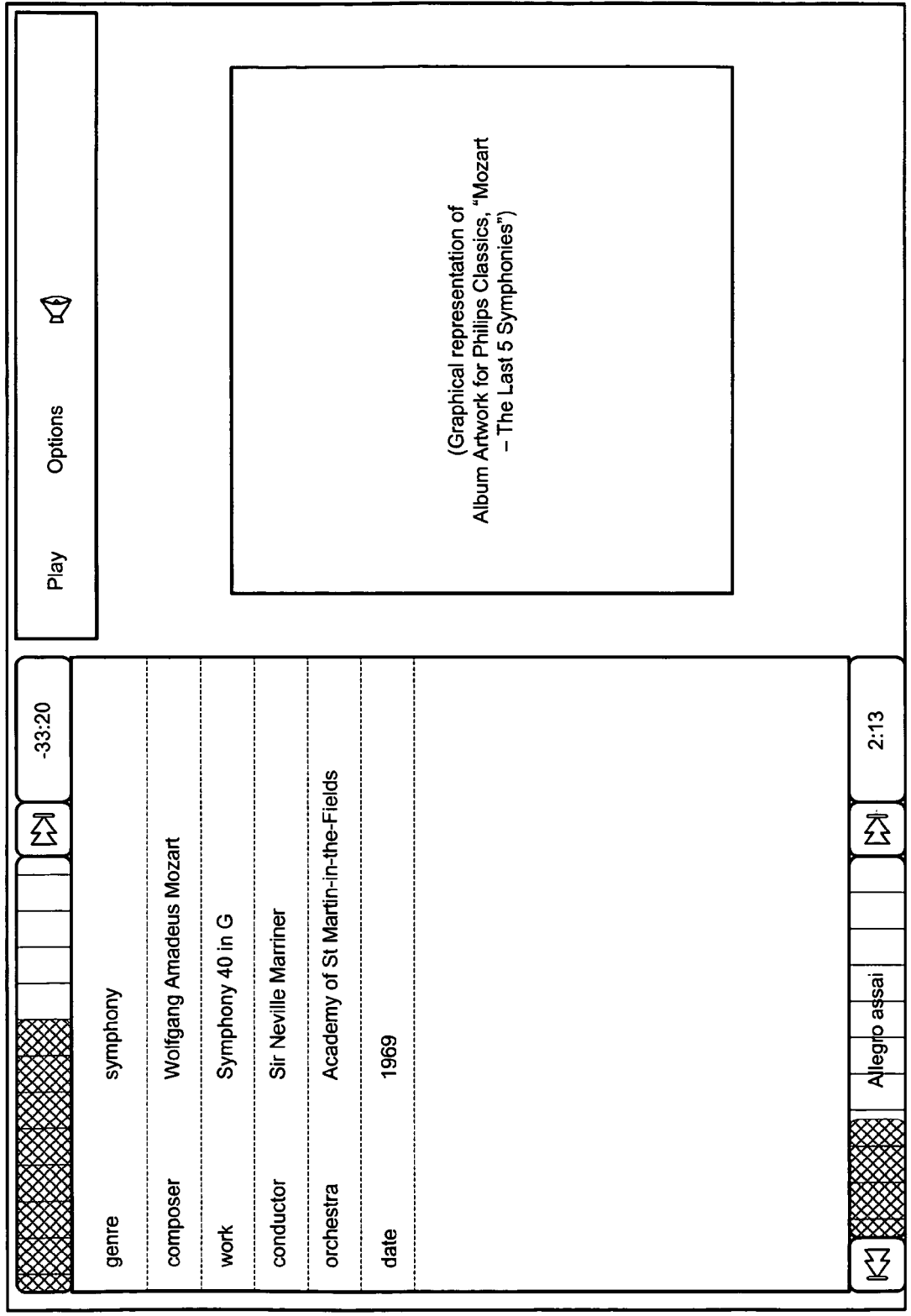
FIG. 4 is an example display of the Metadata catalog of the present invention in Play mode, illustrating long-form Metadata.

FIG. 4 shows a display illustrating Play mode in this embodiment. The large panel on the left contains both Primary and Secondary Album Metadata. Primary Metadata in this example comprises composer, work, and conductor. Secondary Metadata comprises orchestra and date.

Each item of Metadata is displayed with its Tag on the left and its value on the right. All Primary Metadata values are displayed in their long form, so, for example, where the composer was listed as "Rodgers" in the select mode display of FIG. 3, it would appear as "Richard Rodgers" in the play mode display. Similarly, where composer is listed as Wolfgang Amadeus Mozart in the play mode display of FIG. 4, it would be shortened to Mozart in select mode.

In this embodiment, cover art is shown on the right portion of the display.

FIG. 5 is a flow diagram illustrating the creation of a Play Queue. FIG. 3 also shows how a possible realization of the Play Queue might appear. In step 502, the user selects the type of Collection he wants to add to the queue. To specify a list of Tracks, the user clicks the "List" tab, which determines the type of Collection to be "list" and provides a display suitable for selecting the Tracks. After selecting an Album and Tracks as described previously (step 504), the user can drag the selection to the desired position in the panel on the right (step 506), which adds the selection, now a list Collection, to the Play Queue. FIG. 3 shows a list Collection being formed.

Other types of Collections can be defined by clicking one of the other tabs ("File", "Search", and "Random"). In every case, the tab identifies the type of Collection, and the contents of the left side of the display change to permit specification of the Collection. The position in the panel on the right specifies the sequence in which the items play. The user can also drag and drop Collections in the right panel to change the sequence or delete items to remove them from the Play Queue (514).

Figure 6:
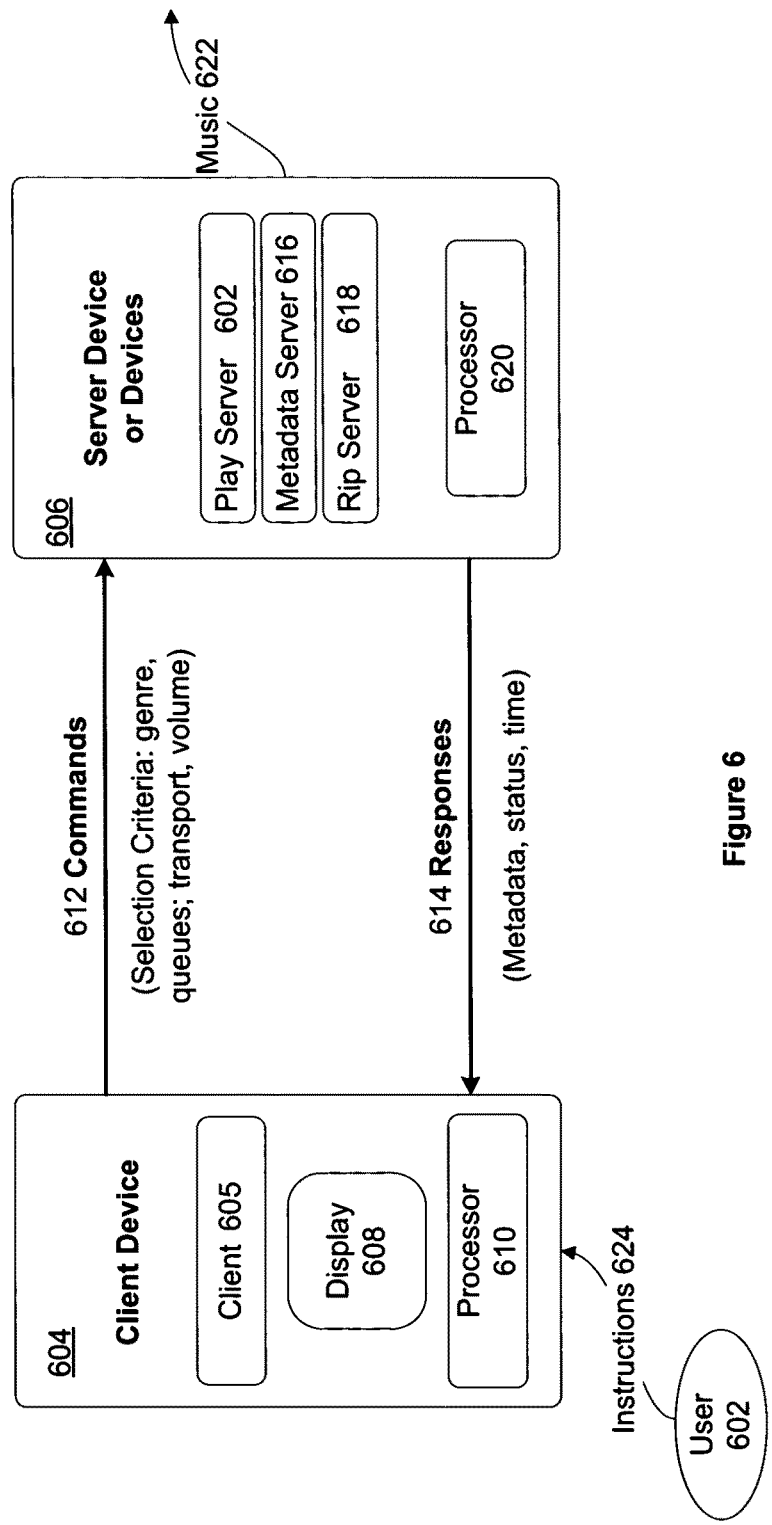
FIG. 6 is a block diagram illustrating a suitable hardware platform for the present invention with one Control Device and one Server Device.

The media system which serves as the hardware platform for the present invention is a variation on systems which are well known in the art. FIG. 6 is a block diagram of such a system. In general, a media system includes a Server Device 606 having Play Server 602, Metadata Server 616, and Rip Server 618 all running on Processor 620, and a Client Device 604 having Client 605, a Display 608, and a Processor 610. For example, Client Device 604 might be a PDA and Server Device 606 might be a home computer. It is also possible that both the Client 605 and the three servers, Play Server 602, Metadata Server 616, and Rip Server 618, reside in the same device e.g., the home computer, in which case Processors 610 and 620 are actually the same entity.

Server Device 606 stores the Genre Templates, the music data (Tracks), and the Metadata associated with the Tracks. The user interacts via user instructions 624 with Client Device 604 to select music to play, to create Play Queues, and to stop and start play. These processes are described in conjunction with FIGS. 2, 3, 4, and 5. Client Device 604 transmits Commands 612 to Server Device 606. For example, when User 602 selects the genre "Pop", Client Device 604 sends a request to Server Device 606 for Metadata for that genre. Server Device 606 returns Metadata for the Pop genre via Responses 614. Commands 612 also include play volume and transport commands such as play and stop. Responses 614 also include play status, whether or not Server Device 606 is playing, and elapsed time. Server Device 606 outputs Music 622.

Figure 7:
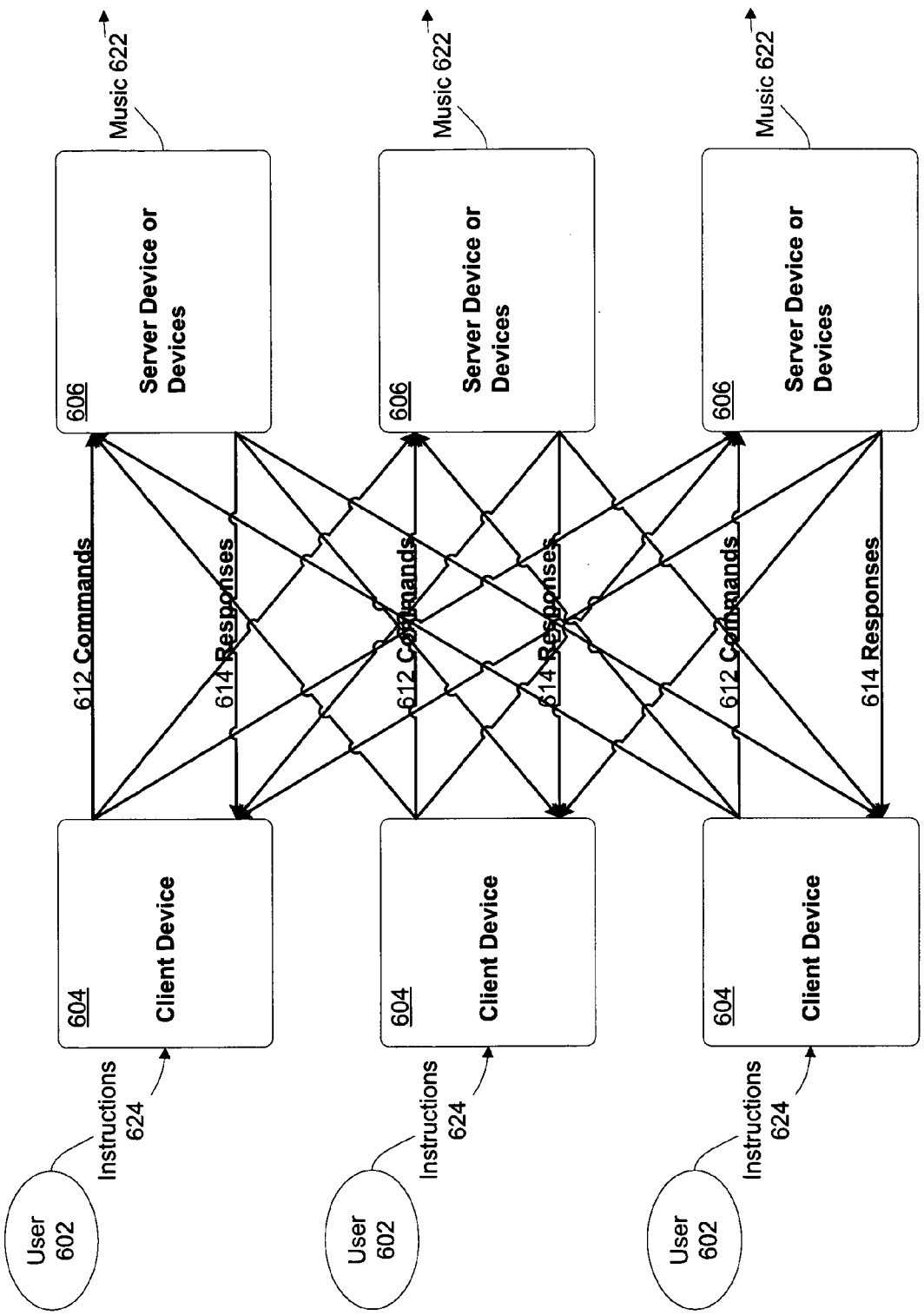
FIG. 7 is a block diagram illustrating a suitable hardware platform for the present invention with multiple Control Devices and multiple Server Devices.

FIG. 7 is a block diagram of a system with multiple Clients and multiple Media Servers as shown in FIG. 6. Each Client 604 is able to communicate with any of the Server Devices 606. This configuration extends the present invention to media systems with multiple Control Devices or multiple Zones.

Track Groups are a set of tracks that share a component of their Primary Track Metadata. Tracks Groups display the shared component only once, saving space. FIG. 8 shows a possible realization of Track Groups. Piano Concerto No. 1 and Piano Concerto No. 2 are both titles of Track Groups. Immediately after the title of the Track Group is a number in parentheses that indicates the number of Tracks within the Track Group. The number at the right margin indicates the duration of the Track Group. The second Track Group is opened to display the individual Tracks within the Track Group. Track Groups conserve display space because they eliminate the need to display the individual Tracks in the Track Group. Chopin wrote 55 Mazurkas. The Track Group for the Mazurkas consumes one line rather than 55. Moreover, when displaying the individual Tracks, it is not necessary to repeat the common information, e.g. Piano Concerto No. 2, because the layout of the information on the display screen makes it clear that the Tracks all share the information in the title of the Track Group. In addition, Track Groups make it easier for the user to make a selection. To play the Chopin Mazurkas, the user can select the Track Group rather than the 55 individual Mazurkas.

These diagrams illustrate one possible embodiment of the present invention. Variations that use flexible Metadata or a Play Queue are within the scope of this invention.

The invention claimed is:

1. A method for cataloguing Albums in a device for selecting and playing Tracks from Albums comprising the steps of:
   (a) defining multiple Genres, wherein different Genres are associated with different sets of Metadata Tags;
   (b) assigning each Album on the device to a Genre;
   (c) assigning a Metadata values to each Metadata Tag in the set associated with the Genre to which an Album is assigned.

2. The method of claim 1, further including the step of selecting and playing a Track by:
- designating a current Genre;
- displaying Metadata Tags and Metadata values for Albums assigned to the current Genre;
- selecting an Album;
- displaying Metadata Tags and Metadata values for Tracks from the selected Album;
- selecting a displayed Track to play and
- activating playing the selected Track.

3. The method of claim 2 further including the step of displaying a short form of Metadata values while selecting a Track and displaying a long form of Metadata values when playing a Track.

4. The method of claim 2, further including the step of displaying more metadata tags while playing a track than while selecting a track.

5. The method of claim 2, further including the steps of:
- assigning Tracks having text that is common to multiple Track titles to a Track Group;
- excising common title text for Tracks within the Track Group; and
- displaying a graphical representation of the Track Group based on the common title text.

6. The method of claim 2, further including the steps of aggregating Tracks to form Collections.

7. The method of claim 6, further comprising the step of forming a play queue by designating Collections to play.

8. The method of claim 6 wherein the step of aggregating comprises at least one of the following steps:
- (a) selecting Tracks from an Album; or
- (b) performing a search of a database and assigning Tracks resulting from the search to a Collection.

9. The method of claim 6, further including the steps of:
- saving a Collection for later retrieval; and
- labeling the saved Collection with a Collection name.

10. The method of claim 9, further including the steps of:
- displaying the names of Collections;
- selecting a Collection by indicating a displayed Collection name; and
- adding the selected Collection to a play queue.

11. An apparatus for allowing a user to select Tracks from Albums comprising:
- a Metadata Server for storing a set of Albums wherein each Album is assigned to a Genre and wherein different Genres are associated with different sets of Metadata Tags;
- a Play Server for playing Tracks; and
- a Client Device including—
  - means for allowing the user to select a Genre;
  - means for retrieving information regarding Albums assigned to the selected Genre from the Metadata Server;
  - means for allowing the user to designate Albums and Tracks from the Albums assigned to the selected Genre, and
  - means for directing the Play Server to play designated Tracks.

12. The apparatus of claim 11 wherein the Metadata Server is configured to store a database including Metadata tags and values associated with Albums and Tracks.

13. The apparatus of claim 11 wherein the Client Device is a handheld unit including an interactive display for allowing the user to select Genres and designate Albums and Tracks.

* * * * *